M. CREMONA.
LIQUID DISPENSING DEVICE.
APPLICATION FILED AUG. 30, 1916.
1,256,298.
Patented Feb. 12, 1918.
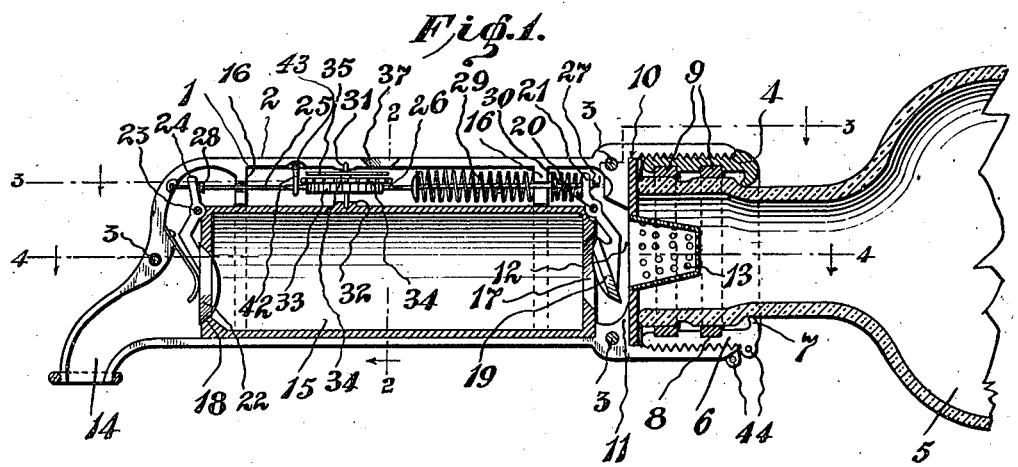
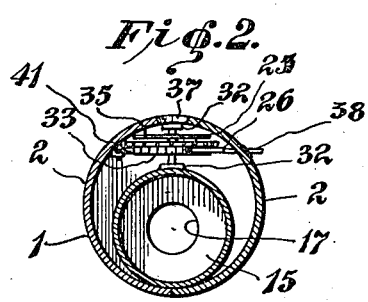
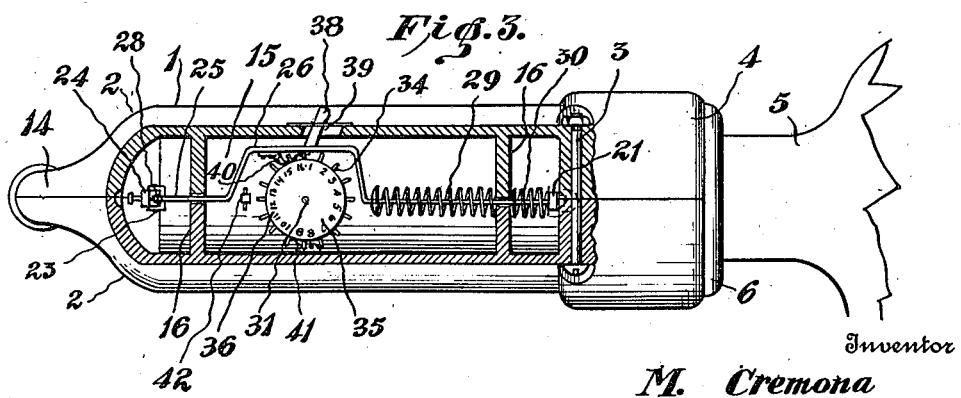
Witness
Thos. F. Knox
Inventor
M. Cremona
By Victor J. Evans
Attorney

UNITED STATES PATENT OFFICE.

MARIO CREMONA, OF NEW YORK, N. Y.

LIQUID-DISPENSING DEVICE.

1,256,298.　　　　　Specification of Letters Patent.　　Patented Feb. 12, 1918.

Application filed August 30, 1916. Serial No. 117,741.

*To all whom it may concern:*

Be it known that I, MARIO CREMONA, a citizen of the United States, residing at New York, in the county of New York and State of New York, have invented new and useful Improvements in Liquid-Dispensing Devices, of which the following is a specification.

This invention is an improved liquid dispensing device for use in connection with a bottle to measure liquid as poured from the bottle and to register the drinks or doses dispensed from the bottle, the object of the invention being to provide an improved device of this character which is simple in construction, is accurate and which can be readily operated and which also prevents the bottle from being refilled.

The invention consists in the features of construction, combination, and arrangement of devices, hereinafter fully described and claimed.

In the accompanying drawings:—

Figure 1 is a longitudinal sectional view of a liquid dispensing and registering device constructed and arranged in accordance with my invention, showing the same attached to the mouth of a bottle.

Fig. 2 is a sectional view of the same on the plane indicated by the line 2—2 of Fig. 1.

Fig. 3 is a transverse sectional view of the same on the plane indicated by the line 3—3 of Fig. 1.

In the embodiment of my invention, I provide a cylindrical body 1 which is here shown as comprising a pair of separable sections 2, which are secured together by screws 3. At its inner end, the body is provided with a socket 4 the wall of which is internally threaded. The mouth of a bottle 5 is arranged in the socket and is held by a collar or sleeve 6 which is secured in the socket, and which has an inturned flange 7 which engages the shoulder formed around the mouth of the bottle. The sleeve is provided with internal annular grooves 8 in which packing rings 9 are arranged. A gasket 10 is arranged between the bottom of the socket and the mouth of the bottle to effect a tight joint between them. That portion 11 of the body which divides the interior of the body from the socket, is provided with an opening 12. A strainer 13 which is here shown as of frusto-conical form is secured in an opening in the gasket and projects into the mouth of the bottle. The body 1 is formed at its outer end with a spout 14 which extends to one side.

A measuring vessel 15 is also provided which is of any suitable capacity to contain a drink of liquor or a dose of medicine or as the case may be, and the said measuring vessel is here shown as cylindrical and is arranged in the body 1 and eccentrically therein and is held in place between surrounding inwardly extending ribs or flanges 16 with which the members of the body 1 are provided. The said measuring vessel is closed at its ends, its inner end as a valve seat 17 and its outer end as a valve seat 18.

A valve 19 is provided to close in the valve seat 17. This valve is pivotally mounted as at 20 at the inner end of the measuring vessel and is adapted to open toward the bottle and is provided with an arm 21. A similar valve 22 is arranged to close in the valve seat 18 and to open outwardly from the measuring vessel and toward the spout. Said valve is pivotally mounted as at 23 on the outer end of the measuring vessel and is provided with an arm 24.

A rod 25 is provided for operating the valves. Said rod is mounted for longitudinal movement in guide openings in the ribs or flanges 16 and has a cranked or offset portion 26 intermediate its ends. Said rod also passes through openings in the valve arms and is provided at its inner end with a stop head or engagement 27 to engage the arm 21 and is also provided near its front end with a stop element or enlargement 28 to engage the valve arm 24. A spring 29 normally moves the valve rod forwardly to cause its stop 27 to coact with the arm 21 and normally keep the inner valve 19 open, the stop 28 normally coacting with the arm 24 to keep the outer valve 22 closed. A spring 30 which is of less strength than the spring 29 is arranged between the valve arm 21 and the inner rib or flange 16.

An arbor 31 is arranged in the space between the wall of the body 1 and the measuring vessel and is mounted in bearings 32. Said arbor is provided with a ratchet wheel 33, a peripherally toothed wheel 34, and an indicating disk 35, the disk being provided with consecutively numbered spaces 36 which correspond with the teeth of the ratchet wheel, and the wheel 34. The body 1 has an observation opening 37, through which the numbers on the disk are sufficiently displayed as the disk turns by step by step movement during operation of the device.

The operating rod is provided with a finger piece 38 which is here shown as attached to the crank portion 26 and as extending outwardly through and movable in a slot 39. A spring pressed pawl 40 is mounted on the crank portion 26 of the operating rod and arranged to successively engage the teeth of the ratchet wheel. A spring pressed pawl 41 is also provided which engages the ratchet wheel and prevents reverse rotation thereof.

To prevent the device from being operated excepting when the same and the bottle is in a horizontal position, I provide a detent 42 which is pivotally mounted at its upper end as at 43 in the upper side of the body 1. When the device is in horizontal position, the detent swings clear of the gear 34 to enable the latter to be rotated and when the device is in upright position, the detent by its own gravity swings into engagement with the bevel of the gear, thus locking the same against rotation.

The operation of the device is as follows: When the bottle with the dispensing device is turned to a horizontal position, the measuring vessel 15 becomes filled with liquid from the bottle, through the opening 17, the valve 19 being normally opened as hereinbefore stated. The user then moves the rod 25 inwardly by means of the finger piece 38, such movement of the rod causing the valve 19 to close and the valve 22 to open so that the liquid measured by the vessel 15 is discharged out through the spout. Such movement of the rod 25 causes its pawl 40 to turn the ratchet wheel a distance equal to one tooth, thus correspondingly rotating the indicating disk and the detent gear 34. The inward movement of the rod enables the spring 30 to close the valve 19. As soon as the finger piece is released the spring 29 moves the rod 25 forwardly, thus causing the stop 28 to coact with the arm 24 closing the outer valve 22 and the stop 20 to coact with the arm 21 in reopening the inner valve 19.

The socket piece of the dispensing attachment and the sleeve 6, are provided with openings 44 for the reception of a wire to enable the attachment to be sealed and prevented from being removed from the bottle without betraying that fact. While the attachment is applied to the bottle, the latter cannot be refilled.

Within the scope of my invention, any suitable means may be provided for attaching the dispensing device to the bottle.

While I have herein shown and described a preferred form of my invention, I would have it understood that changes may be made in the form, proportion and construction of the several parts without departing from the spirit of my invention and within the scope of the appended claims.

Having described the invention, what is claimed is:

1. A liquid dispensing device of the class described comprising a measuring vessel having inlet and outlet openings in opposite ends, inlet and outlet valves pivotally mounted on the ends of said vessel and arranged for movement in reverse directions to uncover said openings, each of said valves having an operating arm, a rod mounted for longitudinal movement, slidably connected to the arms of said valves and having stops to limit the movement of said rod, and cause said valves to reversely operate so that one is closed when the other is open, a spring to close the inlet valve and a stronger spring to normally hold said rod in initial position with the inlet valve open and the outlet valve closed.

2. A liquid dispensing device comprising a body, means to attach the same to the mouth of a bottle, a measuring vessel in the body, inlet and outlet valves arranged respectively at the inner and outer ends of the measuring vessel, means to operate said valves, a registering mechanism actuated by the valve operating means and including a gear, and a gravity acting detent effective when the device is in an upright position to prevent the operation of the valves by engaging and preventing the rotation of said gear.

In testimony whereof I affix my signature.

MARIO CREMONA.